March 15, 1960     O. W. HOSKING     2,928,448
CHECK VALVE
Filed May 4, 1955     2 Sheets-Sheet 1
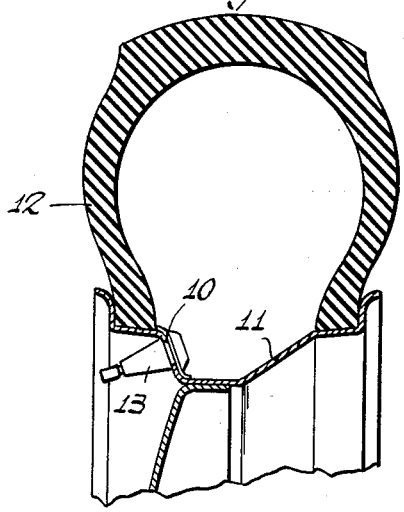
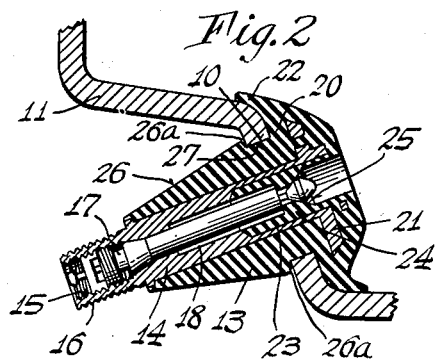
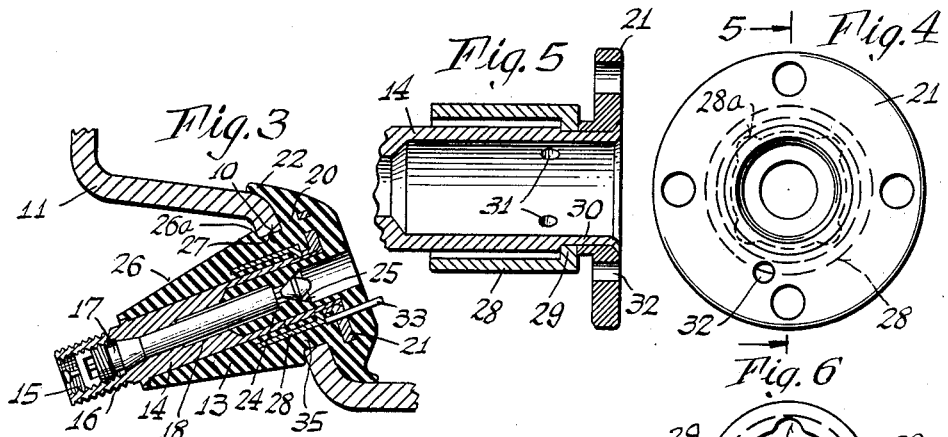
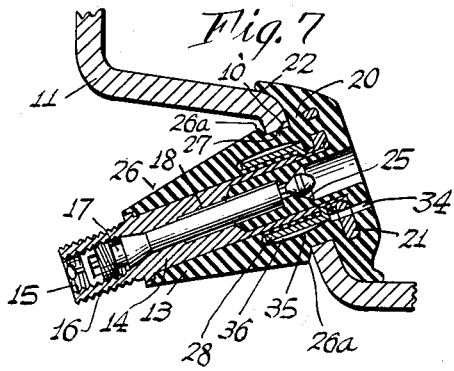
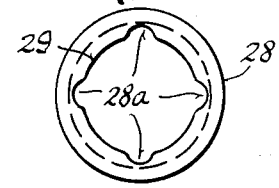
INVENTOR.
Oakley W. Hosking
BY
Johnson and Kline
ATTORNEYS March 15, 1960 — O. W. HOSKING — 2,928,448
CHECK VALVE Filed May 4, 1955 — 2 Sheets-Sheet 2

INVENTOR.
Oakley W. Hosking
BY
Johnson and Kline
ATTORNEYS

United States Patent Office 2,928,448
Patented Mar. 15, 1960

2,928,448

CHECK VALVE

Oakley W. Hosking, Monroe, N.Y., assignor to Hosking Patent Corporation, New York, N.Y., a corporation of New York Application May 4, 1955, Serial No. 505,896

9 Claims. (Cl. 152—427)

This invention relates to check valves, and more particularly to air check valves, especially of the type used for automobile tires.

This application is a continuation-in-part of a division of my application Serial No. 465,591, filed October 29, 1954.

The invention is illustrated and described herein mainly in connection with tubeless tire valves. However, it should be understood that the invention is not limited to the specific structures and applications illustrated herein, since it has utility in connection with various pressurized devices having the need for an air check valve.

An object of the invention is to provide an improved, simple and efficient air check valve adapted to be mounted on an automobile wheel rim, for use with tubeless tires.

A further object of the invention is to provide an improved air check valve for incorporation in a rigid wall of a pressurized vessel, said valve being so arranged and constructed that an increase in the air pressure will tend to more tightly seal the valve to the wall.

A still further object of the invention is to provide an improved tubeless tire valve wherein a rigid and sturdy guard or shell is provided to protect the exterior exposed portion of the valve, thereby to provide a safeguard against damage if the valve should inadvertently come in contact with resistive objects during rotation of the wheel.

A feature of the invention resides in the provision of an improved guarded or protected valve as above set forth, wherein the protective guard or shell may be easily and quickly removed and yet is securely tightly held in its operative position during use.

Still another object of the invention is to provide an improved air check valve in accordance with the above, which may be easily and quickly applied to the supporting wall, and which may be easily changed or replaced when desired.

Another feature of the invention resides in the provision of a tubeless tire valve having a body formed largely of rubber and having a metal guard or shell for the body so arranged and organized that no rubber portions of the body are exposed at the exterior.

A still further object of the invention is to provide an improved tubeless tire valve which may be easily and quickly applied to the wheel rim from the inside, without use of any tools whatsoever.

Other features of the invention reside in the provision of an improved tubeless tire valve having a flexible sealing means engageable with the wheel rim and a flexible valve seat in the stem or body portion, said sealing means and valve seat being integral with each other to insure against leakage of air and to simplify the construction of the valve, and the provision of tubeless tire and air check valves in accordance with any or all of the foregoing, which are simple in construction, having but few parts, and which may be inexpensively manufactured.

Other features and advantages will hereinafter appear.

In the accompanying drawings:

Figure 1 is a fragmentary transverse sectional view of a tubeless tire and wheel rim employing an improved air check valve made in accordance with the present invention.

Fig. 2 is an axial sectional view of a push-through type valve made in accordance with the invention, adapted to be applied to the wheel rim from the inside without the use of any tools whatsoever.

Fig. 3 is an axial sectional view of a valve illustrating the form of the invention, wherein the valve stem is expansible against the edge portions of the mounting aperture.

Fig. 4 is an inside end view of the rigid portion of the body of the valve of Fig. 3.

Fig. 5 is a sectional view taken on line 5—5 of Fig. 4.

Fig. 6 is an end view of a rigid non-adherent collar constituting one of the component parts of the rigid body of Figs. 3 through 5.

Fig. 7 is an axial sectional view like Fig. 3 showing the position of the parts when the valve is under pressure.

Figure 9:
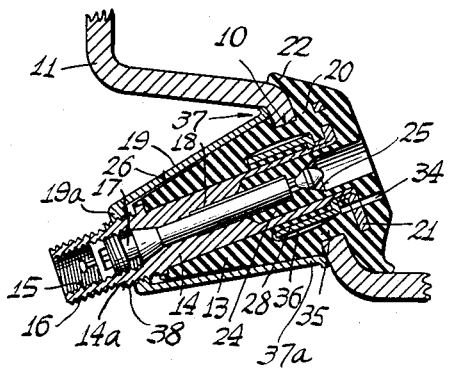
Fig. 9 is a view similar to Fig. 8 showing a modified valve stem and guard or shell thereon.
Figure 10:
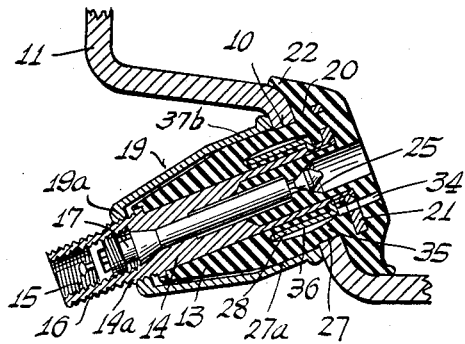
Fig. 10 is a view similar to Fig. 9 showing a modified resilient body and guard or shell thereon.
Figure 8:
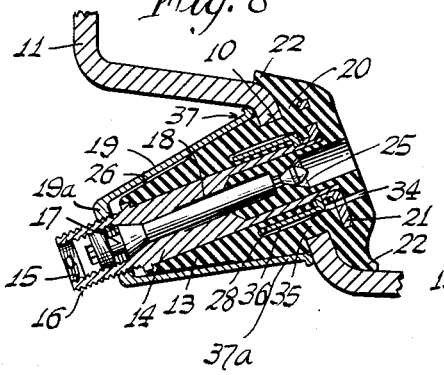
Fig. 8 is an axial sectional view of the valve shown in Figs. 3 and 7, but with the addition of a rigid guard or shell member for protective and ornamental purposes.

The present invention is illustrated in connection with a check valve for controlling the air in a tubeless tire. As shown in Fig. 1, the valve is mounted in an aperture or opening 10 in the rim 11 of a wheel on which the tubeless tire 12 is mounted and controls the inflation of the tire. In the illustrated form of the invention the novel air check valve comprises an elongate, resilient, tubular body 13 having molded therein a tubular rigid stem 14 so that one end of the stem projects from the body and is provided with internally and externally threaded surfaces 15, 16, the internal thread being adapted to secure the valve core 17 in position to control the flow of air through the bore 18 in the stem while the external threads are adapted to receive the usual valve cap, not shown, and/or a protective guard or shell 19, such as shown in Figs. 8 through 10, which encloses the resilient body. The other end of the body 13 is provided with an outwardly projecting annular shoulder or flange 20 which is adapted to be disposed within the wheel rim of the wheel to engage the inner surface thereof and form a seal therewith about the opening in the wheel in which the valve is mounted. If desired, an insert 21 of rigid material is connected to the stem and is disposed within the annular shoulder so as to extend outwardly beyond the opening 10 in the wheel so as to prevent the annular shoulder 20 from collapsing and to reenforce it during its sealing operation. The annular shoulder 20 and insert 21 are in the form of and constitute an annulus.

Outwardly extended from the edge of the annular shoulder or flange is a flexible skirt 22 which extends forwardly and which is adapted to engage the inner surface of the wall. The skirt is so disposed that it will be pressed against the wall by the pressure within the tire to increase the sealing effect of the annular shoulder and to secure an effective seal even though irregular surfaces may be found on the internal surface of the wheel rim.

The bore of the rigid stem is enlarged at the inner end as at 23 and a lining 24 of resilient material having a valve seat 25 to cooperate with the valve core is formed therein. The lining is preferably integral with the annular shoulder of the resilient body.

In the form of the invention shown in Figs. 2 through 9, the exterior surface 26 of the tubular resilient body tapers from the end thereof to a point adjacent the annular shoulder or flange at which point it is provided with a portion of reduced diameter 27 forming a groove which is adapted to be disposed in the opening of the wheel and a shoulder 26a engaging the outer surface of the rim. The shoulder 26a is sufficiently resilient so as to be readily deformed and permit the valve to be pushed through from the inside and set in place without requiring any tools.

Under some circumstances it may be desired to provide auxiliary sealing means for the opening in the rim or other supporting structure. This arrangement is shown in Figs. 3 through 11 wherein the inner end of the stem 14 is surrounded by a sleeve 28 spaced from the stem by means of an inturned end flange 29 mounted on the portion 30 of the stem of reduced diameter. Also carried by the inner portion 30 of the stem 14 is the apertured insert 21 which secures the sleeve in place and is secured to the stem by having the end of the stem headed thereover. The valve stem portion 14 and the insert 21 are preferably of brass, and the sleeve 28 is preferably made of steel. The stem 14 has apertures 31 to provide flow channels for the rubber molding process, and the insert 21 has an aperture 32 which is adapted to accommodate a pin 33 as shown in Fig. 3. Rubber is molded about the stem portion 14, the sleeve 28 and the insert 21 in the form substantially as shown in Figs. 3 through 11, to provide the resilient body 13 around the stem 14, and the sealing annular shoulder or flange 20 with a flexible peripheral skirt 22. The annular groove 27 is molded in the body to accommodate the edge portions of the opening in the wheel rim 11. After the molding of the rubber has been completed, the pin 33 is withdrawn from the valve and discarded, leaving a passage or channel 34, Fig. 7. The valve shown in Figs. 3 to 11 is adapted to be pushed through the opening in the rim from the inside, until it is properly positioned as shown. By virtue of the stem 14 and the insert 21 being of brass, the rubber will adhere to these parts but it will not adhere to the sleeve 28 of steel. Thus when air pressure is introduced into the tire the air will pass through the passage 34 and expand the connector portion 35 of the body 13 as shown in Figs. 7 through 10. This air will occupy the spaces indicated at 36. The expansion of the connector portion 35 is made possible because of the non-adhesion of said portion to the steel of the sleeve 28. Such expansion, however, forces the connector portion 35 against the edges of the opening in the wheel rim, effecting a tight seal therewith. In addition to this, the flexible peripheral skirt 22 of the sealing annular shoulder or flange 20 will seal tightly against the inner surface of the rim. By this construction a double seal is effected. If desired, as shown in Fig. 6, the inner periphery of the flange 29 of the sleeve 28 may have notches 28a to enable air to pass between the inside surface of the sleeve and a rubber occupying the space between the sleeve and the stem, thus providing extra passage for the air which expands the connector portion 35.

Figure 11:
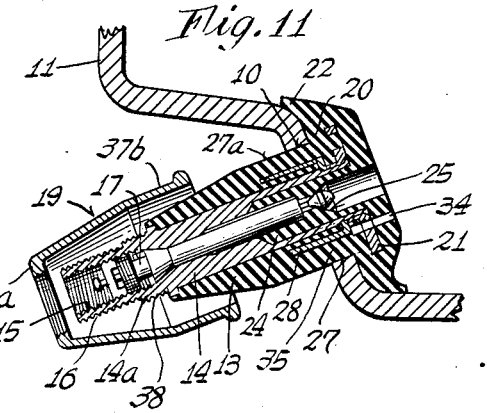
Fig. 11 is an exploded view of the valve of Fig. 10 showing the guard or shell in position to be mounted thereon.

Under some circumstances it has been found that the double seal thus produced is sufficient to adequately seal the tire or container and that it is not necessary to have the shoulder 27 on the body engaging the outer surface of the supporting structure. Such a construction is shown in Figs. 10 and 11 wherein the outer surface of the body is formed as a cylindrical extension 27a of the portion 27 extending through the aperture or opening. This enables the valve to be more easily inserted since it is unnecessary to deform the body of the shoulder during the insertion.

If desired, any of the valves of the present invention can be provided with a protective guard or shell 19 which is adapted to extend over the projecting resilient body and protects it against damage and also assists in locking the valve to the wheel or container.

In the forms of the invention where the projecting portion of the body has a tapered outer portion extending from shoulder 26a, as shown in Figs. 2 through 9, a tapered shell is employed having a slightly different taper, as shown in Figs. 8 and 9, so that the base portion 37 will closely embrace the body adjacent the shoulder 26a and support the body when the end of the shell is moved into engagement with the outer surface of the outer wall. While the shell can be moved into position in many ways, in the illustrated form of the invention the shell is provided with a flange 19a at its outer end which is adapted to be threaded on the end of the stem 14.

When the shoulderless valve of Figs. 10 and 11 is employed, the shell has the tapered portion merge with a substantially cylindrical portion 37b which closely embraces the cylindrical extension 27a of the body and supports it when the shell is threaded into position with its end in engagement with the outer surface of the container.

In valves where the expansible connector portion 35 is provided for producing a seal in the opening, such as shown in Figs. 3 to 11, it will be noted that the expansible portion of the body extends inwardly beyond the inner end of the shell so that when the shell is in position and the tire is inflated pressure in the tire will cause the body portion to expand and bind against the inner surface of the shell portions 37a, 37b and hold the shell against unintentional unscrewing.

The flanges 19a of the shells may be threaded onto the exterior surface of the stem by utilizing the threads 16 normally provided for the tire cap, not shown, as is illustrated in Fig. 8, or the stem can be provided with a portion of larger diameter 14a spaced from the end of the stem and provided with an external thread 38 and on which the flange 19a of the shell is threaded to move the shell into engagement with the wall. With this latter construction, due to the larger threaded opening in the flange to be threaded on the portion 14a, the shell can be quickly moved over the stem into substantially final position before the threads on the flange engage the threads 38 on the enlarged section 14a and the shell threaded into position as is shown in Figs. 9 and 10.

Variations and modifications may be made within the scope of the claims and portions of the improvements may be used without others.

I claim:

1. A combined valve stem and attaching means therefor adapted to be secured to a supporting wall in an opening thereof, comprising an elongate resilient tubular body insertable in the said wall opening and having a rigid stem portion therein and projecting from one end thereof to receive and support a valve core, said body having a laterally, outwardly projecting, resilient shoulder in the form of an annulus at the other end for sealing engagement with one side of said wall when the body is inserted through said opening, the projecting portion of said rigid stem having an externally threaded portion, and a shell threaded on said externally threaded portion and engaging the supporting wall to draw the shoulder into sealing relation with the wall and to protect the projecting resilient tubular body, said shell having an aperture aligned with the rigid stem portion to permit fluid through the stem when the shell is positioned on the stem.

2. The invention as defined in claim 1 in which the annulus includes a rigid insert attached to said rigid stem portion, preventing the annulus from collapsing and being pulled through the opening of the wall.

3. The invention as defined in claim 1 in which there is a resilient valve seat within the rigid stem portion of the body, said valve seat and shoulder being integral and in which said valve seat is adapted to cooperate with a valve core in the rigid stem portion.

4. A combined valve stem and attaching means therefor adapted to be secured to a supporting wall in an opening thereof, comprising an elongate resilient tubular body insertable in the said wall opening and carrying intermediate its ends a laterally outwardly projecting shoulder for engagement with one side of said wall; a shell movably carried by said body for engagement with the opposite side of the supporting wall; cooperable means on the body and shell, for forcing the shell toward said shoulder to clamp the wall therebetween; and a resilient sealing skirt secured to said shoulder and engaging the supporting wall to seal the body to the wall.

5. The invention as defined in claim 1 in which the annulus includes a rigid insert secured to the rigid stem portion and surrounded by the resilient shoulder, said insert preventing the annulus from collapsing and being forced through the opening of the wall.

6. A valve stem adapted to be secured to a supporting wall in an opening thereof comprising an elongate, tubular body having a rigid stem portion insertable in said wall opening and having a laterally, outwardly projecting shoulder in the form of an annulus adjacent one end for engagement with one side of said wall, said body having a resilient and outwardly expansible connector portion adjacent said annulus and engageable with the sides of the opening of the wall with the connector portion being axially longer than the sides of the wall, said rigid stem portion extending from the annulus and having a length axially aligned with the expansible connector portion of the body; a channel formed in the body and extending from the connector portion and the axially aligned length of the rigid stem portion through the annulus for enabling fluid pressure to be introduced in the channel to cause said expansible connector portion to expand outwardly for forcible engagement with the opening of the wall; and a shell surrounding the length of the expansible connector portion of the body protruding beyond the opening, the expansion of said connector portion causing the length to grip the shell and secure the same to the body.

7. A valve stem adapted to be secured to a supporting wall in an opening thereof comprising an elongate, tubular body having a rigid stem portion insertable in said wall opening and having a laterally, outwardly projecting shoulder in the form of an annulus adjacent one end for engagement with one side of said wall, said body having a resilient and outwardly expansible connector portion adjacent said annulus and engageable with the sides of the opening of the wall with the connector portion being axially longer than the sides of the wall; said rigid stem portion extending from the annulus and having a length axially aligned with the expansible connector portion of the body; a channel formed in the body and extending from the connector portion through the annulus for enabling fluid pressure to be introduced in the channel to cause said expansible connector portion to expand outwardly for forcible engagement with the opening of the wall, said connector portion being adapted to be disposed within and engageable with the edges of the opening of the wall, a sleeve encased by said resilient connector portion axially aligned but spaced from the axial length of the stem, the surfaces of the sleeve being unbonded to the expansible connector portion of the body, said channel communicating with the exterior surface of the sleeve and the adjacent surface of the connector portion, and a shell surrounding the length of the expansible connector portion of the body protruding beyond the opening, whereby fluid under pressure from an area alongside the annulus may pass to the surfaces and cause outward expansion of the expansible connector portion of the body against the sides of the opening and the shell to cause the length to grip the shell and secure the same to the body.

8. A valve stem adapted to be secured to a supporting wall in an opening thereof comprising an elongate, tubular body insertable in said wall opening and having a rigid stem portion therein and projecting from one end thereof to receive and support a valve core, said body having a laterally, outwardly projecting shoulder in the form of an annulus adjacent one end for engagement with one side of said wall and having a resilient and outwardly expansible connector portion adjacent said annulus and engageable with the sides of the opening of the wall; a channel formed in the body and extending from the connector portion and the exterior of the adjacent portion of the rigid stem portion through the annulus for enabling fluid pressure to be introduced in the channel to cause said expansible connector portion to expand outwardly for forcible engagement with the opening of the wall, the projecting portion of said rigid stem portion having an externally threaded portion, and a shell threaded on said externally threaded portion and engaging the supporting wall to draw the annulus into sealing relation with the wall and to limit deformation of the resilient connector portion of the body.

9. A valve stem adapted to be secured to a supporting wall in an opening thereof comprising an elongate, tubular body insertable in said wall opening and having a rigid stem portion therein and projecting from one end thereof to receive and support a valve core, said body having a laterally, outwardly projecting shoulder in the form of an annulus adjacent one end for engagement with one side of said wall and having a resilient and outwardly expansible connector portion adjacent said annulus and engageable with the sides of the opening of the wall; a channel formed in the body and extending from the connector portion and the exterior of the adjacent portion of the rigid stem portion through the annulus for enabling fluid pressure to be introduced in the channel to cause said expansible connector portion to expand outwardly for forcible engagement with the opening of the wall, the projecting portion of said rigid stem portion having an externally threaded portion located inwardly of and of larger diameter than the end, and a shell threaded on said enlarged portion and engaging the supporting wall to draw the annulus into sealing relation with the wall and to limit deformation of the resilient connector portion.

References Cited in the file of this patent

UNITED STATES PATENTS

| | | |
|---|---|---|
| 750,675 | Michelin | Jan. 26, 1904 |
| 2,049,252 | Eberhard | July 28, 1936 |
| 2,084,784 | Stahl | June 22, 1937 |
| 2,126,770 | Hammond | Aug. 16, 1938 |
| 2,255,932 | Kraft | Sept. 16, 1941 |
| 2,475,451 | Gouirand | July 5, 1949 |
| 2,634,785 | Tubbs | Apr. 14, 1953 |
| 2,769,476 | Herzegh et al. | Nov. 6, 1956 |
| 2,836,217 | Boyer | May 27, 1958 |